Oct. 16, 1928.
W. C. BOGART
1,688,110
TROLLING HEAD
Filed March 9, 1927
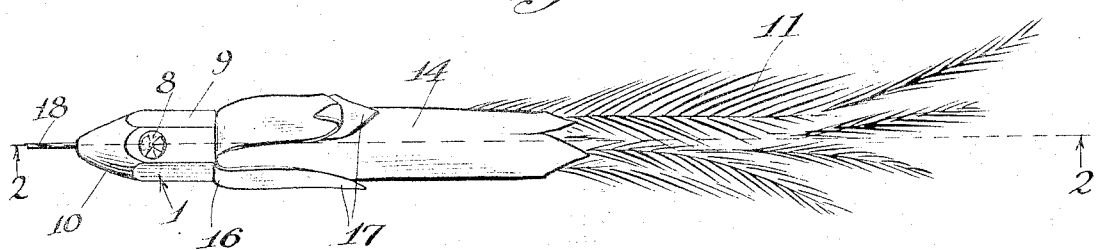
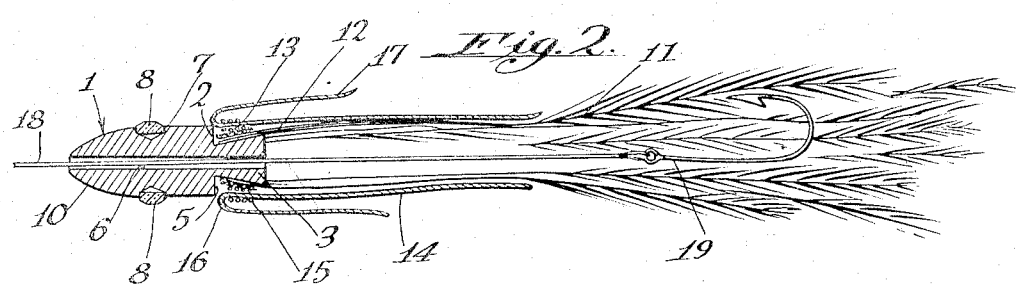
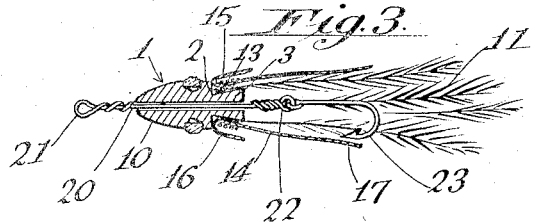
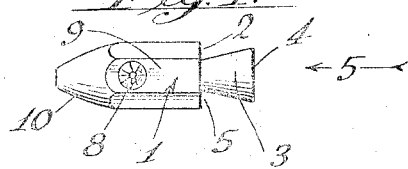
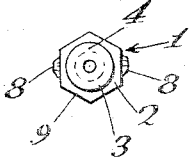
Inventor
William C. Bogart
by Hazard and Miller
Attorneys Patented Oct. 16, 1928.

1,688,110

UNITED STATES PATENT OFFICE.

WILLIAM C. BOGART, OF LOS ANGELES, CALIFORNIA.

TROLLING HEAD.

Application filed March 9, 1927. Serial No. 173,890.

My invention is a trolling head to be used with a trolling hook for fishing.

An object of my invention is the construction of a trolling head which simulates a fish's head having reflectors forming eyes and a body structure formed of parchment or equivalent material simulating the fish's body, and with a series of feathers forming the tail portion of the trolling head.

Another object of my invention is to construct the trolling head so that the line to which the hook is attached may pass freely through the head, thus allowing the trolling head to slide on the line relative to the hook, or when used to catch small sized fish the head may be connected to the hook at a fixed spacing therefrom.

My invention is illustrated in its several aspects in the accompanying drawings, in which:

Figure 1 is a side elevation of the head.

Figure 2 is a longitudinal section on the line 2—2 of Fig. 1 in the direction of the arrows.

Figure 3 is a longitudinal section of a slight modification.

Figure 4 is a side elevation of the solid structure of the head.

Figure 5 is a rear view of the solid structure taken in the direction of the arrow 5 of Fig. 4.

The solid structure of the trolling device comprises a head structure 1 having a shoulder 2 at its rear end and an outwardly flared body structure 3. The rear end 4 of the body structure is of greater width than the distance between the inner portions 5 of such body structure. A bore 6 extends through the head part and through the body part 3 of the device. A pair of recesses 7 are on opposite sides of the head and in these recesses are secured glass eyes 8 which are preferably formed of cut glass to reflect light in different directions and also preferably colored red or some other bright color. The head portion has sides parallel to the bore 6 and these are preferably flattened as indicated by the numeral 9 and I find it satisfactory to make the device hexagonal. A nose 10 is slightly tapered.

A series of feathers 11 have their stems 12 fitted over the body part 3 and are bound thereto by cord binding 13. Strips of parchment 14 or equivalent material are fitted around the stems of the feathers and are secured over the binding 13 by an outside binding 15. By means of a reverse bend 16 the ends 17 of the parchment are bent rearwardly. The free ends of the feathers preferably extend to a considerable distance beyond the ends of the parchment and this parchment simulates the body part of a fish and the feathers the tail.

In one manner of constructing my invention the fishing line 18 extends loosely through the bore 6, there being preferably a swivel on the forward end of the line and a hook 19 is connected to the line rearwardly of the trolling hook. By this construction the hook may be first thrown in the water and then the head either thrown or dropped to follow the hook, whence on pulling the hook it is pulled in close to the trolling head and is thus in a position for use in fishing.

In the modification shown in Fig. 3 a wire stem 20 extends through the bore and has an eye 21 on its forward end to which may be connected a line, or a swivel connected to a line. This stem has an eye 22 at its rear end to which is connected the hook 23. In this structure the hook is held in substantially a fixed relation to the trolling head.

In regard to the action of my trolling head, it may be stated that when pulled through the water it simulates the appearance and motion of a fish and the colored or jeweled glass forming the eyes appears quite brilliant and apparently attracts fish and, on account of the whole device simulating a fish in motion, my invention makes an effective trolling device.

It is to be noted that a characteristic feature of my invention is that the stems of the feathers are secured to the flared part 3 of the body of the trolling head behind the shoulder 2, and also that the parchment covering 14 is also secured to the same flared part of the body, and this parchment trails over the stem and part of the feathers. This parchment body is thus flexible and bends and flares to a certain extent when the trolling head is drawn through the water. This gives a different action from solid coverings on trolling devices which are intended to simulate fish by the coloring and material used. Moreover, in applicant's construction the ends 17 of the parchment flex more or less when the head is drawn through the water, as these extend considerably rearwardly of the solid part of the head. It is usual to make this head and body part of metal in order to give sufficient weight to act as a sinker.

Various changes may be made in the principles of my invention without departing from the spirit thereof, as set forth in the description, drawings and claims.

I claim:

1. A trolling device comprising in combination a solid head structure, a plurality of feathers having their stems secured to the rear end of said structure, a covering of parchment also secured to the rear end, said parchment extending over the stems of the feathers and behind the head structure, completely encircling the stems of the feathers and being flexible.

2. A trolling device comprising in combination a solid head structure having a shoulder with an outwardly flared rear body structure, a plurality of feathers having their stems secured to the flared end behind the shoulder and trailing behind the flared body, a parchment covering secured to the flared end and extending rearwardly thereof, said parchment encircling the stems of the feathers and being flexible.

3. A trolling device comprising in combination a head structure having a shoulder at its rear portion and outwardly flared body at the rear end, a series of feathers having their stems secured to the flared body at the rear end, a parchment covering encircling the stems of the feathers and being secured to the flared body at the rear end, the parchment extending rearwardly of such end and being flexible, and having strips of fabric formed by a reversed bend of the fabric at the flared body, said ends extending rearwardly of the body and being flexible.

4. A trolling device comprising in combination a solid head having a shoulder extending inwardly from the periphery of the head and having an outwardly flared body structure at the rear end, there being a central bore through the head and body structure, a series of feathers having stems secured to the flared body structure, a parchment covering encircling the stems secured to such body structure and projecting rearwardly thereof, the parchment being flexible, a leader wire extending through the said bore and having a hook attached thereto, the leader being freely slidable for a limited distance.

5. A trolling device comprising in combination a metal head structure having an inwardly extending annular shoulder and a conical shaped body extending rearwardly from the shoulder, there being a central bore through the head and the body structure with glass secured to the head simulating eyes, a series of feathers having stems secured to the conical shaped body structure, a parchment covering secured to said body structure and surrounding the stems of the feathers, the parchment extending rearwardly from the said body structure, a series of outside parchment strips also secured to the said body structure and extending rearwardly thereof, the parchment being flexible and a wire leader extending through the said bore and having a hook, the leader having a limited sliding movement in the said bore.

In testimony whereof I have signed my name to this specification.

WILLIAM C. BOGART.